2,971,006
Patented Feb. 7, 1961

2,971,006
1-(-ALKYL OR -HYDROXYALKYL)-1-(2-PROPYNYL)-2-ALKYLIMIDAZOLINIUM HALIDES

Raymond L. Mayhew, Phillipsburg, N.J., and Earl P. Williams, Pen Argyl, Pa., assignors to General Aniline & Film Corporation, New York, N.Y., a corporation of Delaware No Drawing. Filed Dec. 11, 1959, Ser. No. 858,856

6 Claims. (Cl. 260—309.6)

This invention relates to a new class of imidazolinium halides and particularly to 1-(-alkyl or -hydroxyalkyl)-1-(2-propynyl)-2-alkylimidazolinium halides.

We have found that 1-(-alkyl or -hydroxyalkyl)-1-(2-propynyl)-2-alkylimidazolinium halides are readily prepared by reacting 1 mole of 1-(-alkyl or -hydroxyalkyl)-2-alkylimidazoline with 1 mole of a propargyl halide at a temperature ranging between 70–90° C. in the presence of isopropanol as a solvent diluent. The resulting 1-(-alkyl or -hydroxyalkyl)-1-(2-propynyl)-2-alkylimidazolinium halides are new compounds having new and unexpected applications such as surface active agents, bactericides, biocides, and particularly as fungicides.

The new compounds of the present invention are characterized by the following general formula:

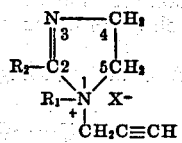

wherein $R_1$ represents an alkyl of from 1 to 4 carbon atoms, e.g., methyl, ethyl, propyl, isopropyl, or butyl, or hydroxyalkyl of from 2 to 4 carbon atoms, e.g., hydroxyethyl, hydroxypropyl, or hydroxybutyl, $R_2$ represents an alkyl radical of from 10 to 20 carbon atoms, e.g. decyl, undecyl, dodecyl, pentadecyl, octadecyl or eicosadecyl, and X represents a halogen anion, i.e., Br, Cl or I.

As examples of 1-(-alkyl)-2-alkylimidazolines and 1-(-hydroxyalkyl)-2-alkylimidazolines that may be reacted with propargyl halide the following are illustrative:

1-(-methyl)-2-decylimidazoline
1-(-ethyl)-2-decylimidazoline
1-(-propyl)-2-decylimidazoline
1-(-isopropyl)-2-decylimidazoline
1-(-butyl)-2-decylimidazoline
1-(2-hydroxyethyl)-2-decylimidazoline
1-(3-hydroxypropyl)-2-decylimidazoline
1-(4-hydroxybutyl)-2-decylimidazoline
1-(-methyl)-2-dodecylimidazoline
1-(-ethyl)-2-dodecylimidazoline
1-(-propyl)-2-dodecylimidazoline
1-(-isopropyl)-2-dodecylimidazoline
1-(-butyl)-2-dodecylimidazoline
1-(2-hydroxyethyl)-2-dodecylimidazoline
1-(3-hydroxypropyl)-2-dodecylimidazoline
1-(4-hydroxybutyl)-2-dodecylimidazoline
1-(-methyl)-2-pentadecylimidazoline
1-(-ethyl)-2-pentadecylimidazoline
1-(-propyl)-2-pentadecylimidazoline
1-(-isopropyl)-2-pentadecylimidazoline
1-(-butyl)-2-pentadecylimidazoline
1-(2-hydroxyethyl)-2-pentadecylimidazoline
1-(3-hydroxypropyl)-2-pentadecylimidazoline
1-(4-hydroxybutyl)-2-pentadecylimidazoline
1-(-methyl)-2-octadecylimidazoline
1-(-ethyl)-2-octadecylimidazoline
1-(-propyl)-2-octadecylimidazoline
1-(-isopropyl)-2-octadecylimidazoline
1-(-butyl)-2-octadecylimidazoline
1-(2-hydroxyethyl)-2-octadecylimidazoline
1-(3-hydroxypropyl)-2-octadecylimidazoline
1-(4-hydroxybutyl)-2-octadecylimidazoline
1-(-methyl)-2-eicosadecylimidazoline
1-(-ethyl)-2-eicosadecylimidazoline
1-(-propyl)-2-eicosadecylimidazoline
1-(-isopropyl)-2-eicosadecylimidazoline
1-(-butyl)-2-eicosadecylimidazoline
1-(2-hydroxyethyl)-2-eicosadecylimidazoline
1-(3-hydroxypropyl)-2-eicosadecylimidazoline
1-(4-hydroxybutyl)-2-eicosadecylimidazoline All of the foregoing imidazolines are well known and methods for their preparation are described in the literature.

The propargyl halide which may be reacted with the foregoing imidazolines is either propargyl bromide, chloride or iodide.

The following examples will illustrate the manner in which the 1-(-alkyl or hydroxyalkyl)-1-(-2-propynyl)-2-alkylimidazolinium halides characterized by the foregoing general formula are prepared and utilized.

Example I

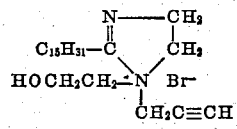

1-(2-hydroxyethyl)-1-(2-propynyl)-2-pentadecylimidazolinium bromide

Into a 500 ml. flask equipped with a thermometer, stirrer and condenser was placed 97.2 grams—0.3 mole—1-(2-hydroxyethyl)-2 - pentadecylimidazoline and 60.0 grams isopropanol. The contents of the flask were heated to 70° C. and 35.6 grams—0.3 mole propargyl bromide added over a period of one hour at 70–78° C. and held at this temperature for two hours longer. At the end of this time the reaction product was completely water soluble and foamed well.

Titration for unreacted amine showed that the conversion of tertiary amine to quaternary nitrogen was 73%. The reaction product was recrystallized from acetone as a brown powder and weighed 52 grams.

Example II

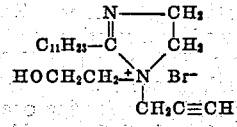

1-(2-hydroxyethyl)-1-(2-propynyl)-2-undecylimidazolinium bromide

Example I was repeated with the exception that 97.2 grams of 1-(2-hydroxyethyl)-2-pentadecylimidazoline were replaced by 80.4 grams—0.3 mole of 1-(2-hydroxyethyl)-2-undecyl imidazoline. At the end of three hours, the reaction product was water soluble and foamed well. It was recrystallized from acetone as a brown powder and weighed approximately 70 grams.

Example III

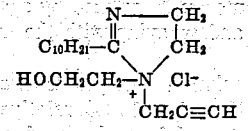

1-(2-hydroxyethyl)-1-(2-propynyl)-2-decylimidazolinium chloride

Example I was repeated with the exception that 35.6 grams of propargyl bromide were replaced by 22.3 grams—0.3 mole of propargyl chloride and the reaction temperature maintained at 75° C. for 4 hours. At the end of this time, the reaction product was water soluble and foamed well. It was recrystallized from acetone as a brown powder and weighed 80 grams.

Example IV

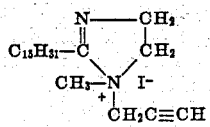

1-(-methyl)-1-(2-propynyl)-2-pentadecylimidazolinium iodide

Example I was repeated with the exception that 97.2 grams of 1-(2-hydroxyethyl)-2-pentadecylimidazoline were replaced by 92.2 grams—0.3 mole of 1-methyl-2-pentadecylimidazoline and the propargyl bromide replaced by 356 grams of propargyl iodide. The reaction mixture was heated together for 2 hours at 75° C. to form a water-soluble product which foamed very well and was recrystallized from acetone as a brown powder and weighed approximately 75 grams.

Example V

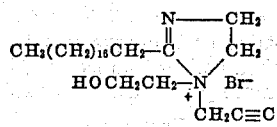

1-(2-hydroxyethyl)-1-(2-propynyl)-2-octadecylimidazolinium bromide

Example I was again repeated with the exception that 97.2 grams of 1-(2-hydroxyethyl)-2-pentadecylimidazoline were replaced by 105.6 grams—0.3 mole of 1-(2-hydroxyethyl)-2-octadecyl imidazoline. The reaction product was water soluble and foamed well. It was recrystallized from acetone as a brown powder and weighed 85 grams.

Inasmuch as all of the products prepared in accordance with the present invention and characterized by the foregoing general formula are soluble in water and foam very well, this was a clear cut indication that they are effective surface active agents.

In order to demonstrate their effectiveness as fungicides the following test procedure was resorted to:

Late blight fungus, *Phytophthora infestous*, is the organism used in this test procedure. The organism is reared on sterile wheat seeds in flask kept at room temperature. Organisms used are transferred 10 days prior to testing. A slurry is made of the mycelia and this is broken up by means of a Waring Blendor before application to the test plants.

Duplicate tomato plants, Bonny Best Variety, 4–5 inches high are placed on a rotating turntable and sprayed with the products of Examples I to V formulated in 90 ml. of water, 10 ml. of acetone and 0.01% of a surface active agent obtained by condensing one mole of nonylphenol with 15 moles of ethylene oxide. One hundred to 110 mls. of solution is applied to the pair of plants using a De Vibbis spray gun with air pressure set at 40 pounds. Application of this spray takes 30 seconds and the foliage is wetted to run off. The test solution is formulated to contain 1000 p.p.m. of the active component. Six plants are sprayed with the formulation without the test compound and are held as checks. An additional six plants are sprayed with Captan and are held for comparison standards. As soon as the spray has dried, the plants are inoculated by again placing them on the turntable and spraying with the mycelial brei for 30 seconds.

Following inoculation the plants are incubated for 48 hours at 72° F. and at 100% relative humidity. The plants are then removed from the incubator chamber and placed in a shade house in the greenhouse for an additional 48 hours.

The total number of lesions per eleven 15 × magnifications fields on 11 leaflets of the three top leaves of each plant are counted. A similar count is made on the check plants and on the plants treated with the standard. The average number of lesions per plant is calculated. Control is rated according to the following designations:

E=0–5 lesions per plant.
D=6–14 lesions per plant.
C=15–24 lesions per plant.
B=no more than 25 lesions per plant.
A=no control.

RESULTS OF TEST N (1000 P.P.M.)

| Compound: | Rating |
|---|---|
| Product of Example I | D/D |
| Product of Example II | D/D |
| Product of Example III | D/D |
| Product of Example IV | D/D |
| Product of Example V | D/D |
| Check | A/A |

We claim:

1. A new composition of matter having the following formula:

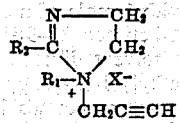

wherein $R_1$ represents a member selected from the class consisting of alkyl of from 1 to 4 carbon atoms and hydroxy alkyl of 2 to 4 carbon atoms, $R_2$ represents alkyl of from 10 to 20 carbon atoms and X represents a halogen selected from the class consisting of bromine, chlorine and iodine.

2. A composition of matter having the following structural formula:

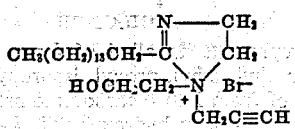

3. A composition of matter having the following structural formula:

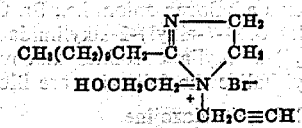

4. A composition of matter having the following structural formula:

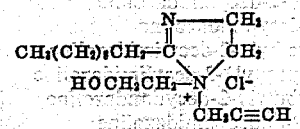

5. A composition of matter having the following structural formula:

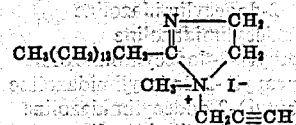

6. A composition of matter having the following structural formula:

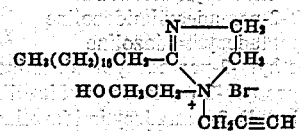

No references cited.